United States Patent Office

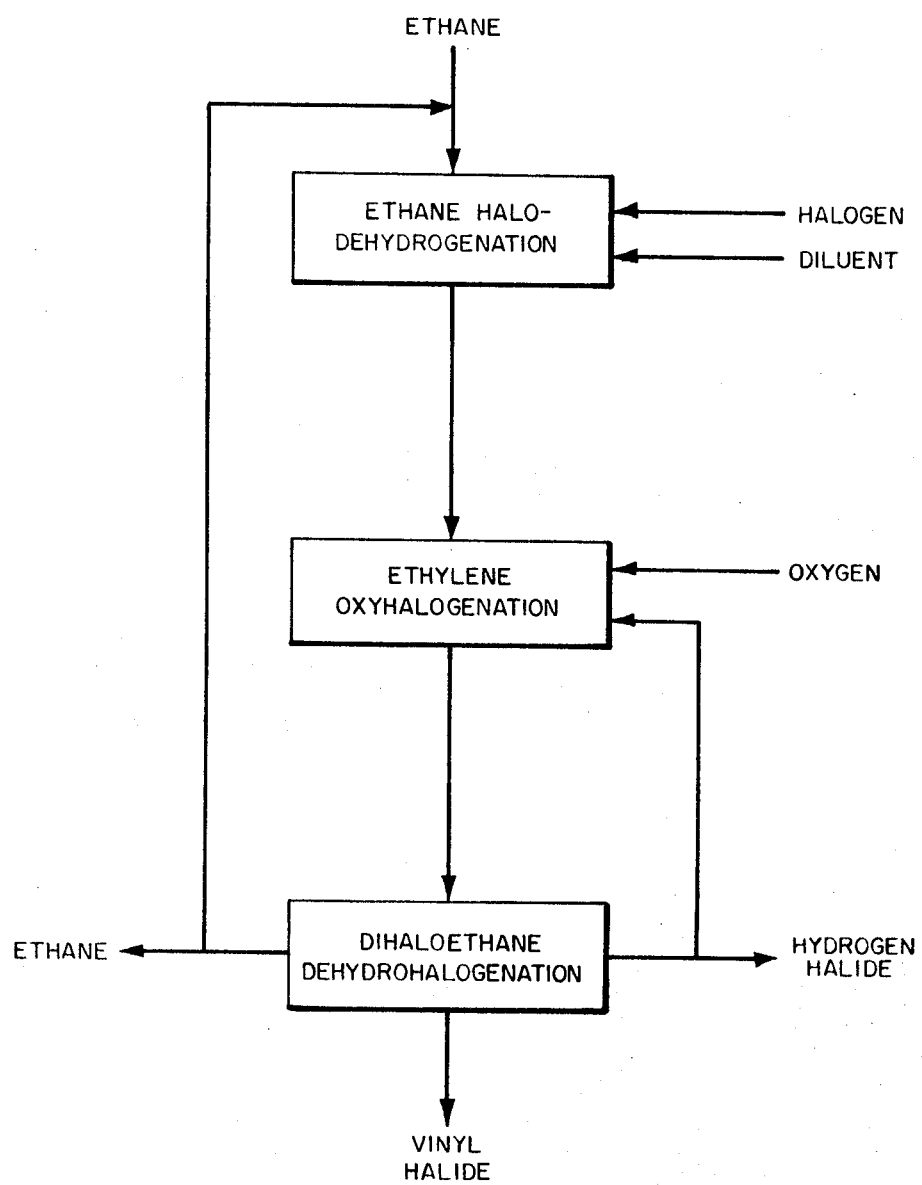

3,658,934
Patented Apr. 25, 1972

3,658,934
ETHYLENE FROM ETHANE AND HALOGEN THROUGH FLUIDIZED RARE EARTH CATALYST
William Q. Beard, Jr., Wichita, Kans., assignor to Ethyl Corporation, New York, N.Y.
Filed July 14, 1969, Ser. No. 841,456
Int. Cl. C07c 3/28, 5/18
U.S. Cl. 260—683.3       16 Claims

ABSTRACT OF THE DISCLOSURE

Process for the preparation of vinyl halide by halodehydrogenation of ethane to ethylene in the presence of an inert diluent, oxyhalogenation of the ethylene to 1,2-dihaloethane, dehydrohalogenation of the 1,2-dihaloethane to vinyl halide, and recycle of part or all of either or both ethane and hydrogen halide from the vinyl halide step to the halodehydrogenation and oxyhalogenation steps, respectively. A preferred catalyst for the halodehydrogenation step includes a low concentration of copper or iron halide with rare earth halide, the ratio of rare earth halide to copper or iron halide being greater than 1:1. Other preferred catalyst components include alkali metal halide and manganese halide.

BACKGROUND OF THE INVENTION

The present integrated process for the production of vinyl halide begins with the production of ethylene from ethane. Unsaturated hydrocarbons such as ethylene are commonly produced by either thermal cracking or catalytic cracking or a combination of both. In the known processes the principal disadvantage is low conversion of the saturated hydrocarbon to unsaturated hydrocarbon. In the literature, the reported conversion is rarely greater than about 40 percent. See, for instance, U.S. Pat. 3,119,883, U.S. Pat. 2,971,995 and British Pat. 969,-416. It will be seen that product streams containing less than 30 percent of ethylene are not uncommon. In addition to low hydrocarbon conversion, the prior art processes often result in a product containing a variety of materials which are difficult to separate. For instance, in the case where ethane is the feed material substantial quantities of acetylene and methane are often produced. When ethylene is the desired product, serious problems are encountered due to the difficulty of separating these materials. Also, when a catalyst is employed in the known processes, experience has shown that periodic shutdown is necessary due to the fouling of the catalyst with tars and resins. Also, in many cracking operations exceedingly high temperatures are often necessary, e.g. see U.S. Pat. 3,119,883.

A primary purpose of the present invention is the provision of a multi-step process for the production of vinyl halide beginning with the halodehydrogenation of ethane to ethylene and proceeding through the oxyhalogenation of the ethylene to 1,2-dihaloethane and the dehydrohalogenation of the 1,2-dihaloethane to vinyl halide, thereby enabling savings to be effected in one embodiment through recycling the hydrogen halide produced in the vinyl halide step back to the oxyhalogenation step.

Another primary purpose of this invention is to provide a unique process for the halodehydrogenation of ethane to produce ethylene wherein the conversion of ethane to ethylene is substantially increased. Other purposes are the provision of (1) a continuous haloheydrogenation process wherein shutdown due to catalyst fouling is avoided, (2) a halodehydrogenation process which does not require excessively high temperatures and (3) a halodehydrogenation process wherein the products formed are suitable for use in an oxyhalogenation process.

SUMMARY OF THE INVENTION

The present invention concerns a process for the halodehydrogenation of ethane to ethylene, the improvement comprising employing an inert diluent with the halogen.

The invention further involves a process for the preparation of vinyl halide by cracking dihaloethane which has been prepared by oxyhalogenating ethylene which has been prepared by halodehydrogenating ethane, the improvement comprising recycling the hydrogen halide produced in the cracking to the oxyhalogenation.

In addition the invention provides a process for the preparation of vinyl halide by cracking dihaloethane which has been prepared by oxyhalogenating ethylene which has been prepared by halodehydrogenating ethane, the improvement comprising employing an excess of ethane in the halodehydrogenation and recycling the unreacted part of the excess ethane from the cracking to said halodehydrogenation.

Even further the invention involves a supported catalyst for the production of ethylene by the halodehydrogenation of ethane in the presence of a halogen and an inert diluent which comprises, in combination, from about 0.15 weight percent to about 3 weight percent of a metal halide selected from the group consisting of copper halide and iron halide, the weight percent being based on the total weight of said supported catalyst, and rare earth halide, the weight ratio of said rare earth halide to said metal halide being in excess of 1:1.

BRIEF DESCRIPTION OF THE DRAWING

The drawing shows a block diagram of the flow scheme of the present invention.

DESCRIPTION OF THE PREFERRED EMBODIMENTS

The above and other purposes are accomplished stepwise, first by a process for the halodehydrogenation of ethane and the production of ethylene by contacting ethane with a fluidized catalyst, halogen and an inert diluent at a temperature above 350° C., or preferably from about 400° C. to about 650° C., and a pressure above atmospheric, or preferably from about one atmosphere to about 30 atmospheres, the fluidized catalyst being composed of a mixture containing essentially from about 0.15 percent to about 3.0 percent copper or iron halide and from about 5 percent to about 20 percent rare earth halides (hydrated) supported on a fluidized carrier, the percentages being based on the total weight of catalyst and support. The weight percent of the rare earth halides as set forth herein is based on the hydrated form, although such halides need not be hydrated during use.

According to this process, ethane is converted to ethylene in yields as high or higher than 60 percent, without the occurrence of catalyst fouling or the necessity of the excessive temperatures normally associated with cracking operations. Furthermore, this method provides in one embodiment for the economical use of by-product hydrogen halide, for exaample hydrogen chloride which was at one time a troublesome by-product in the petrochemical industry and often disposed of by dumping into pits containing oyster shells, but is now in short supply and strong demand. Moreover, this process utilizes ethane, an abundant and inexpensive hydrocarbon, as a raw material for conversion into the more valuable chemical, ethylene, and eventually into the still more valuable chemical, vinyl halide.

The primary reason for these improved results in halodehydrogenation is the use of a fluidized, supported mixture of copper or iron halide and rare earth halides. In all instances the ratio of rare earth halide (hydrated) to copper or iron halide must exceed 1:1 and should very preferably fall within the ranges hereinafter specified. Preferred conditions are (in weight percent, based on the total amount of catalyst and support) a catalyst mixture supported on a fluidized solid carrier containing essentially from about 0.15 to about 3.0 percent copper or iron halide and from about 5 percent to about 20 percent rare earth halides (hydrated). Preferably, the catalyst mixture contains from about 0.25 percent to about 0.35 percent copper halide or from about 0.3 percent to about 0.4 percent iron halide and from about 8 to about 15 percent rare earth halides (hydrated). When the amount of rare earth halide and copper or iron halide in the catalyst significantly deviates from that specified above, ethylene is not usually produced and, if produced at all, is produced in only small quantities. Instead, halogenated hydrocarbons are produced as the major product. This very significant relationship between the amount of copper or iron halide and rare earth halides will be apparent from the examples set forth below.

By the term "rare earth halide" is meant the halides of the elements in the lanthanum series, that is, elements having an atomic number of from 57 through 71, and mixtures of these compounds. Included among the rare earth elements are thulium, lanthanum, cerium, praseodymium, neodymium, prometheum, samarium, europium, gadolinium terbium, dysprosium, holmium, erbium, ytterbium, lutecium, yttrium. Among the elements cerium is preferred, but praseodymium and neodymium are also excellent catalyst components for the present process. However, since these materials are usually found in nature in mixtures, it is very convenient to use a commercially available mixture. The mixtures used in formulating the catalyst contain rare earth halides, preferably chlorides, or oxides or other mixtures. Examples of minerals containing the rare earths are zircon, thorite, monazite, gadolinite, cerite, orthite, and the like. The mixture known in the art as didymium is suitable, but the mixture extracted from monazite without removal of cerium and thorium is preferred.

The temperature of the halodehydrogenation process should be above 350° C. and should preferably range from about 400° C. to about 650° C. and more preferably from about 475° C. to about 600° C. It is desirable that the pressure range from about 1 atmosphere to about 30 atmospheres and preferably from about 1 atmosphere to about 20 atmospheres.

The fluidized support for the halodehydrogenation catalyst may be any of the known inert carriers such as sand, diatomaceous earth, alumina, silica gel, pumice, bauxite, chromiaalumina, and the like. Preferably the catalyst support is chromiaalumina, but alumina and silica are highly satisfactory. It is also highly preferable that the particle size of the impregnated catalyst be within the range of from about 120 mesh to about 325 mesh (U.S. Sieve No.). In other words, the preponderance of the catalytic material be no coarser than about 120 mesh and no finer than about 325 mesh. There is no necessity that all particles be of uniform size. The size distribution generally varies throughout the ranges indicated. Usually, it is preferred that not more than about 90 percent of the catalyst be finer than 325 mesh and that no more than about 50 percent of the cataalyst be coarser than 120 mesh.

If desired, an alkali metal halide may be added to the halodehydrogenation catalyst mixture in a concentration of from about 0.01 percent by weight to about 5 percent by weight, based on the total weight of catalyst and support. Preferably, it is added in concentrations of about 0.05 percent to about 3 percent, and more preferably from about 0.1 to about 2 percent. The alkali metal halides employed are preferably the halides of lithium, sodium, potassium, rubidium and cesium. The addition of alkali metal halide to the catalyst mixture is a preferred embodiment of the invention, and among the alkali metal halides, lithium halide is most preferred.

Other halodehydrogenation catalyst additives also enhance the performance of the catalyst of this invention. Among such additives, manganese halide in a concentration of from about 1 to about 10 percent by weight, based on the total weight of catalyst and support is preferred. Other suitable additives include zinc halide, calcium halide, and titanium halide, among which calcium halides is preferred in a concentration of from about 1 to about 10 percent by weight, based on the total weight of catalyst and support.

The addition of iron halide to the copper halide containing catalyst, or vice versa, has also been found beneficial, depending upon the type and quantity of other components in the catalyst. A concentration of iron or copper halide additive of from about 1 to about 10 weight percent, based on the total weight of catalyst and support, is preferred.

Another important feature of the halodehydrogenation step of this invention is the molar feed ratio ethane/halogen/diluent which preferably varies in the range 1/0.25 to 2/2 to 4. The diluent may be an inert gas such as nitrogen, argon, helium, carbon dioxide, and the like.

The rate of flow of gases through the reaction zone is subject to some variation. Thus, sufficient flow of gases must be provided for fluidization of the support catalyst. On the other hand, gas flow should not be so extreme as to blow significant quantities of the catalyst out of the reaction zone. It is generally preferable that the superficial linear velocity of the gases entering the reactor be maintained within a range of from about 0.1 to about 5 feet per second. More preferably, for reasons of economy, the superficial linear velocity is maintained at from about 0.5 feet per second to about 3.5 feet per second. A suitable contact time is one ranging from about 1 second up to about 20 seconds, and preferably, for best conversion, the contact time should be from about 2 to about 15 seconds.

The halodehydrogenation feed ethane, halogen and an inert diluent may be fed together into the bottom of the reactor. This can be varied however, and it is indeed often desirable to do so. For instance, two of the reactants are fed into one portion of the reaction zone and the other reactant into another portion.

As shown in the flow scheme depicted in the drawings, the above described ethane halodehydrogenation is the first of a three-step process for producing vinyl halide. One embodiment of this process requires the recycle of part or all of the hydrogen halide from the last step to the second. Another embodiment requires feeding an excess of ethane to the first step in order to react all halogen therein, whereby enough ethylene and hydrogen halide are produced for the oxyhalogenation step. Therefore, in this latter embodiment none, part, or all of the hydrogen halide may be recycled from the last step to the second, while the excess ethane which passes unreacted through the second and third steps may be partly or completely recycled to the first step. Thus, the process envisions complete flexibility with regard to ethane and halogen halide recycle so that none, part, or all of either stream may be recycled or sent elsewhere as economy and balance with other facilities and processes dictate.

While the ethane halodehydrogenation process above described is unique, conventional processes known in the art are suitable for the oxyhalogenation and dehydrohalogenation (or thermal cracking) steps. However, according to a preferred embodiment a mixture of from about 1 to about 50 weight percent ethane, from about 40 to about 95 weight percent ethylene, and from about 20 to about 40 weight percent hydrogen halide are passed from the ethane halodehydrogenation step to the oxyhalogenation reactor wherein there is maintained a pressure of from about 50 to about 250 p.s.i.g. and a temperature of from about 200 to about 400° C. The reactants are passed through a supported metal halide catalyst which is maintained in a fluidized state by a reactant flow rate of from about 0.2 to about 2 feet per second at reaction temperature. Contact time is maintained between about 1 and about 20 seconds. Operating under these conditions, from about 60 to about 99 percent conversion of ethylene to 1,2-dihaloethane is achieved.

Also according to a preferred embodiment, the product mixture from the oxyhalogenation step which includes from about 50 to about 90 percent 1,2-dihaloethane, from about 1 to about 20 weight percent ethane, and from about 5 to about 20 weight percent hydrogen halide is passed to a dehydrohalogenation furnace wherein is maintained a temperature of from about 400 to about 600° C. and a pressure of from atmospheric to about 200 p.s.i.g. Operating in this fashion, a conversion of 1,2-dihaloethane to vinyl halide of from about 60 to about 90 weight percent is achieved. The vinyl halide is separated from the hydrogen halide by quench and distillation. Uncracked dihaloethane is recycled back to the furnace.

In the following examples, which are intended to be descriptive rather than restrictive, ethane, halogen, and diluent were fed into the bottom of a vertically elongated reaction vessel precharged with a fluidizable catalyst. The catalyst compositions are in weight percent, based on the total weight of catalyst and support. The weight percent of the rare earth halides component (including cerium halide and didymium halide) is calculated on the basis of its hydrated form, although during use, it is not necessarily fully or even partially hydrated.

| Example | I | II | III |
|---|---|---|---|
| Molar feed ratio: ethane/Cl$_2$/diluent. | [1] 1/0.55/3.0 | [2] 1/0.55/3.0 | [1] 1/1/3 |
| Catalyst composition (wt. percent): | | | |
| CuCl$_2$ | 0.30 | 0.30 | 0.30 |
| Rare earth Cl (hydrated) | 10.0 | 10.0 | 10.0 |
| LiCl | 0.06 | 0.06 | 0.06 |
| Catalyst support | Alumina | Alumina | Alumina |
| Temperature (° C.) | 550 | 550 | 550 |
| Pressure (atm.) | 1 | 1 | 1 |
| Ethane conversion (percent) | 53.1 | 49.8 | 78.0 |
| Ethylene yield (percent) | 94.4 | 96.1 | 83.4 |

[1] Nitrogen.  [2] Argon.

EXAMPLE IV

The preceding examples are repeated so that each example includes runs which differ with regard to use of the following copper chloride or iron chloride (substituted for copper chloride) concentrations (in weight percent, based on the total weight of catalyst and support): 0.01, 0.05, 0.1, 0.15, 0.2, 0.25, 0.3, 0.35, 0.4, 0.45, 0.5, 1.0, 5.0, 10.0. Optimum results are indicated to be between 0.25 and 0.35 weight percent for copper chloride and 0.3 to 0.4 weight percent for iron chloride.

EXAMPLE V

The preceding examples are repeated so that each example includes runs which differ in the use of the following iron chloride concentrations where copper chloride is already employed or copper chloride where iron chloride is already employed (in weight percent, based on the total weight of catalyst and support): 1, 3, 5, 7, 10.

EXAMPLE VI

The preceding examples are repeated so that each example includes runs which differ with regard to use of cerium chloride, didymium chloride, or rare earth chlorides extracted from monazite without removal of cerium or thorium, each in the following concentrations (in weight percent, based on the total weight of support and hydrated catalyst): 0.01, 0.1, 1, 5, 10, 15, 20, 25. Cerium chloride performs best, and optimum results therefor are indicated to be between 5 and 15 weight percent.

EXAMPLE VII

The preceding examples are repeated so that each example includes runs which differ with regard to use of lithium chloride, sodium chloride, potassium chloride, rubidium chloride or cesium chloride, each in the following concentrations (in weight percent, based on the total weight of catalyst and support): 0.01, 0.05, 0.1, 0.5, 1, 2, 5, 10. Lithium chloride performs best, and optimum results therefor are indicated to be between 0.5 and 2 weight percent.

EXAMPLE VIII

The proceeding examples are repeated so that each example includes runs which differ with regard to use of manganese chloride, calcium chloride, zinc chloride or titanium chloride, each in the following concentrations (in weight percent, based on the total weight of catalyst and support): 0.01, 1, 5, 10, 20. Manganese chloride performs best, with calcium chloride being better than either zinc chloride or titanium chloride; optimum results for both manganese chloride and calcium chloride are indicated to be between 1 and 10 weight percent.

EXAMPLE IX

The preceding examples are repeated so that each example includes runs at the following temperatures: 300° C., 350° C., 650° C. and 700° C. Optimum results are indicated to be between 350° C. and 650° C.

EXAMPLE X

The preceding examples are repeated so that each example includes runs which differ with regard to use of the following catalyst supports: sand, diatomaceous earth, alumina, silica gel, pumice, bauxite, or chromia-alumina. Chromia-alumina performs best, with alumina and silica gel being better than the other supports.

EXAMPLE XI

The preceding examples are repeated so that each example includes runs which differ with regard to the following pressures (in atmospheres): 2, 5, 10, 13, 15, 20, 30.

EXAMPLE XII

The preceding examples are repeated so that each example includes runs which differ as follows with respect to the molar feed ratio ethane/chlorine/inert diluent: 1/0.1/3, 1/2/3, 1/0.1/0.1, 1/2/6, 1/1/6, 1/1/0.1.

EXAMPLE XIII

The preceding examples are repeated, first, omitting the rare earth chlorides and, second, employing the following concentrations of iron chloride or copper chloride and rare earth chlorides (in weight percent, based on the total weight of catalyst and support): (1) 4 percent iron chloride or copper chloride and 3 percent rare earth chlorides (2) 10 percent iron chloride or copper chloride and 0.5 percent rare earth chlorides (3) 15 percent iron chloride or copper chloride and 0.15 percent rare earth chlorides. In each instance low yields of ethylene are experienced.

EXAMPLE XIV

The preceding examples are repeated, first changing the chlorine to bromine, the hydrogen chloride to hydrogen bromide, and the metal chlorides to metal bromides; and second, changing the chlorine to iodine, the hydrogen chloride to hydrogen iodide, and the metal chlorides to metal iodides. Good results are experienced except with Example XIII.

EXAMPLE XV

The product mixtures from the preceding examples (except Example XIII) are passed into the bottom of a vertically elongated reactor containing a copper halide catalyst supported on alumina. Oxygen is also admitted to the reactor. The catalyst is fluidied by a reactant flow rate of 0.5 feet per second at a reaction temperature of 300° C. and 150 p.s.i.g. to establish a contact time of 5 seconds.

EXAMPLE XVI

The product mixtures from Example XV are passed into a cracking furnace at a temperature of 450° C. and 100 p.s.i.g. The product vinyl halide, hydrogen halide, ethane, and unreacted dihaloethane from the furnace is quenched and distilled, the unreacted dihaloethane is recycled to the furnace, the hydrogen halide is recycled to the oxyhalogenation processes respectively set forth in the preceding examples (except Example XIII), and the vinyl halide is recovered as product.

EXAMPLE XVII

Example XVI is repeated except the hydrogen halide is not recycled while the ethane is recycled to the halodedydrogenation.

EXAMPLE XVIII

Example XVI is repeated and the ethane is recycled to the halohydrogenation.

While the catalytic mixtures of this invention can be deposited upon the fluidized solid support in a number of different ways, a very simple and highly preferred method of impregnating the support is to dissolve in water or an alcohol a weighed amount of the components of the catalyst mixture. A weighed amount of the support is then added to the water or alcohol and the contents stirred until completely homogeneous. The water or alcohol is then evaporated at low temperature from the so-formed slurry. The evaporation is conveniently done by drying at a low temperature, e.g. about 100° C., in a low temperature air circulating oven. The dry impregnated support remaining can then be employed in the process of this invention.

I claim:

1. A process for the production of ethylene which comprises contacting ethane, at an elevated temperature and pressure, with (1) a mixture consisting essentially of a halogen and an inert gaseous diluent, and with (2) a fluidized catalyst which consists essentially of a rare earth halide, an inert catalyst support and a compound selected from the group consisting of copper halide and iron halide.

2. The process of claim 1 wherein the diluent is selected from the group consisting of nitrogen, helium, and carbon dioxide.

3. The process of claim 1 wherein said fluidized catalyst additionally contains a compound selected from the group consisting of calcium halides and manganese halides in a concentration of from about 1 to about 10 percent by weight based on the total weight of catalyst and support.

4. The process of claim 1 wherein said fluidized catalyst contains copper halide and from about 1 to about 10 weight percent of iron halide based on the total weight of catalyst and support.

5. The process of claim 1 wherein said fluidized catalyst contains iron halide and from about 1 to about 10 weight percent copper halide based on the total weight of catalyst and support.

6. The process of claim 1 wherein said catalyst includes an alkali metal halide.

7. The process of claim 6 wherein said alkali metal halide is lithium halide.

8. The process of claim 1 wherein said fluidized catalyst additionally contains an alkali metal halide in a concentration of from about 0.01 percent to about 5 percent by weight based on the total weight of catalyst and support.

9. The process of claim 1 wherein said compound selected from the group consisting of copper halide and iron halide is in a concentration of from about 0.15 to about 3.0 weight percent, based on the total weight of catalyst and support.

10. The process of claim 1 wherein said compound selected from the group consisting of copper halide and iron halide is in a concentration of from about 0.15 to about 3.0 weight percent, based on the total weight of catalyst and support, and the ratio of the concentration of rare earth halide to said compound is greater than 1:1.

11. The process of claim 1 wherein the catalyst support is selected from the group consisting of silica gel, aluminum and chromia-alumina.

12. The process of claim 1 wherein said rare earth halide is cerium halide.

13. The process of claim 1 wherein for every mole of ethane there are from about 0.25 to 2 moles of halogen and from about 2 to about 4 moles of diluent.

14. The process of claim 1 wherein the reaction occurs at a temperature of from about 400° C. to about 650° C. and at a pressure of from about one atmosphere to about 30 atmospheres.

15. The process of claim 1 wherein said compound is copper halide in a concentration of from about 0.15 to about 3.0 weight percent, the weight percent being based on the total weight of catalyst and support, and wherein the rare earth halide is a cerium halide, and the weight ratio of the concentration of cerium halide to said copper halide is greater than 1:1.

16. In a process for the halodehydrogenation of ethane to ethylene by contacting a halodehydrogenation feed consisting essentially of ethane and a halogen with a fluidized catalyst, the improvement therein, wherein the fluidized catalyst consists essentially of from about 0.15 to about 3.0 percent copper halide or iron halide, from about 5 percent to about 20 percent rare earth halide, from about 0.01 percent to about 5 percent of an alkali metal halide and an inert catalyst support, all percentages being by weight based upon the total weight of catalyst and support and wherein the halodehydrogenation feed additionally contains an inert gaseous diluent.

References Cited

UNITED STATES PATENTS

| | | | |
|---|---|---|---|
| 3,542,895 | 11/1970 | Russell | 260—683.3 |
| 3,483,136 | 12/1969 | Van Der Pdas et al. | 252—441 |
| 3,496,242 | 2/1970 | Berkovitz et al. | 260—664 |
| 3,542,897 | 11/1970 | Wattimena et al. | 260—683.3 |
| 3,267,161 | 8/1966 | Ukaji et al. | 260—659 |

DELBERT E. GANTZ, Primary Examiner

G. E. SCHMITKONS, Assistant Examiner

U.S. Cl. X.R.

252—442, 462; 260—656 R, 662 A, 677 X A